United States Patent
Ichimiya

(10) Patent No.: US 6,522,394 B2
(45) Date of Patent: Feb. 18, 2003

(54) RANGEFINDER DEVICE AND CAMERA

(75) Inventor: Takashi Ichimiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/935,188

(22) Filed: Aug. 22, 2001

(65) Prior Publication Data

US 2002/0048011 A1 Apr. 25, 2002

(30) Foreign Application Priority Data

Aug. 23, 2000 (JP) ........................................ 2000-253038

(51) Int. Cl.⁷ .............................. G01C 3/00; G03B 13/00
(52) U.S. Cl. .................... 356/3.06; 356/3.07; 396/104; 396/106; 396/123
(58) Field of Search ............................. 356/3.01–4.01; 396/104, 106, 123

(56) References Cited

U.S. PATENT DOCUMENTS 6,222,996 B1 * 4/2001 Nonaka ...................... 396/106
6,366,736 B1 * 4/2002 Nonaka ...................... 396/106

OTHER PUBLICATIONS

Japanese Patent Publication (Kokoku) No. 05–022843, published Jun. 10, 1985.

Japanese Patent Laid–Open Publication (Kokai) No. 09–196665, published Jul. 31, 1997.

* cited by examiner

*Primary Examiner*—Stephen C. Buczinski
(74) *Attorney, Agent, or Firm*—Robin, Blecker & Daley

(57) ABSTRACT

A rangefinder device and a camera are provided, which, in measuring a distance by the active method, are capable of properly measuring the distance even if the object to be measured is located at a short distance, while in measuring a distance by the passive method, are capable of measuring the distance without causing the conflict between far and near objects. A projecting section projects spot-shaped light on a range-finding object. A light receiving section comprises a plurality of photoelectric converting elements. A first calculating section calculates distance measurement information based on an output from the light receiving section receiving reflected light from the range-finding object, by driving the projecting section to project the light, and a second calculating section calculates distance measurement information based on an output from the light receiving section receiving extraneous light reflected from the range-finding object, without driving the projecting section. A control section sets a light receiving range of the light receiving section used for calculation of the distance measurement information by the second calculating section to be narrower than a light receiving range of the light receiving section used for calculation of the distance measurement information by the first calculating section.

16 Claims, 10 Drawing Sheets

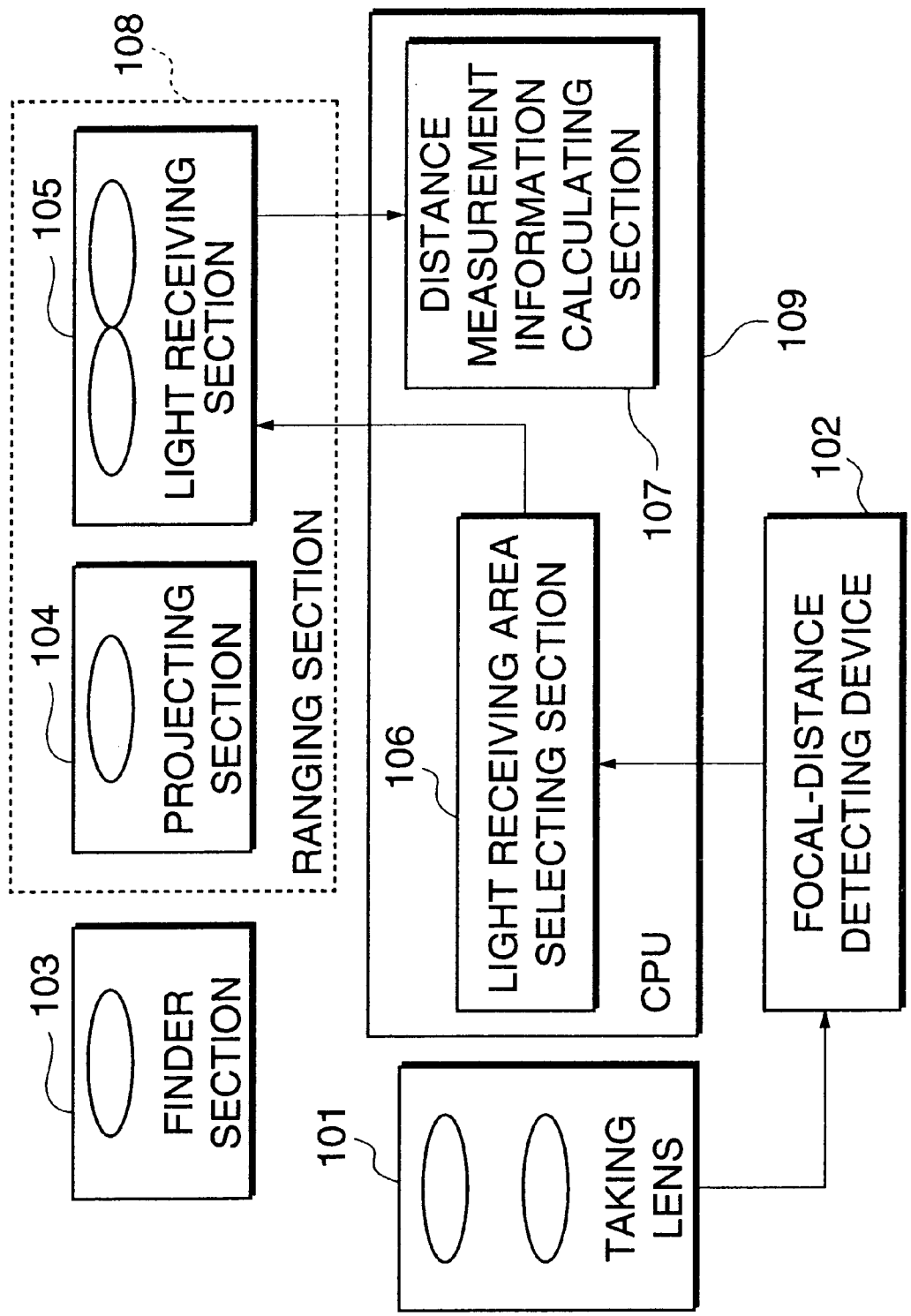

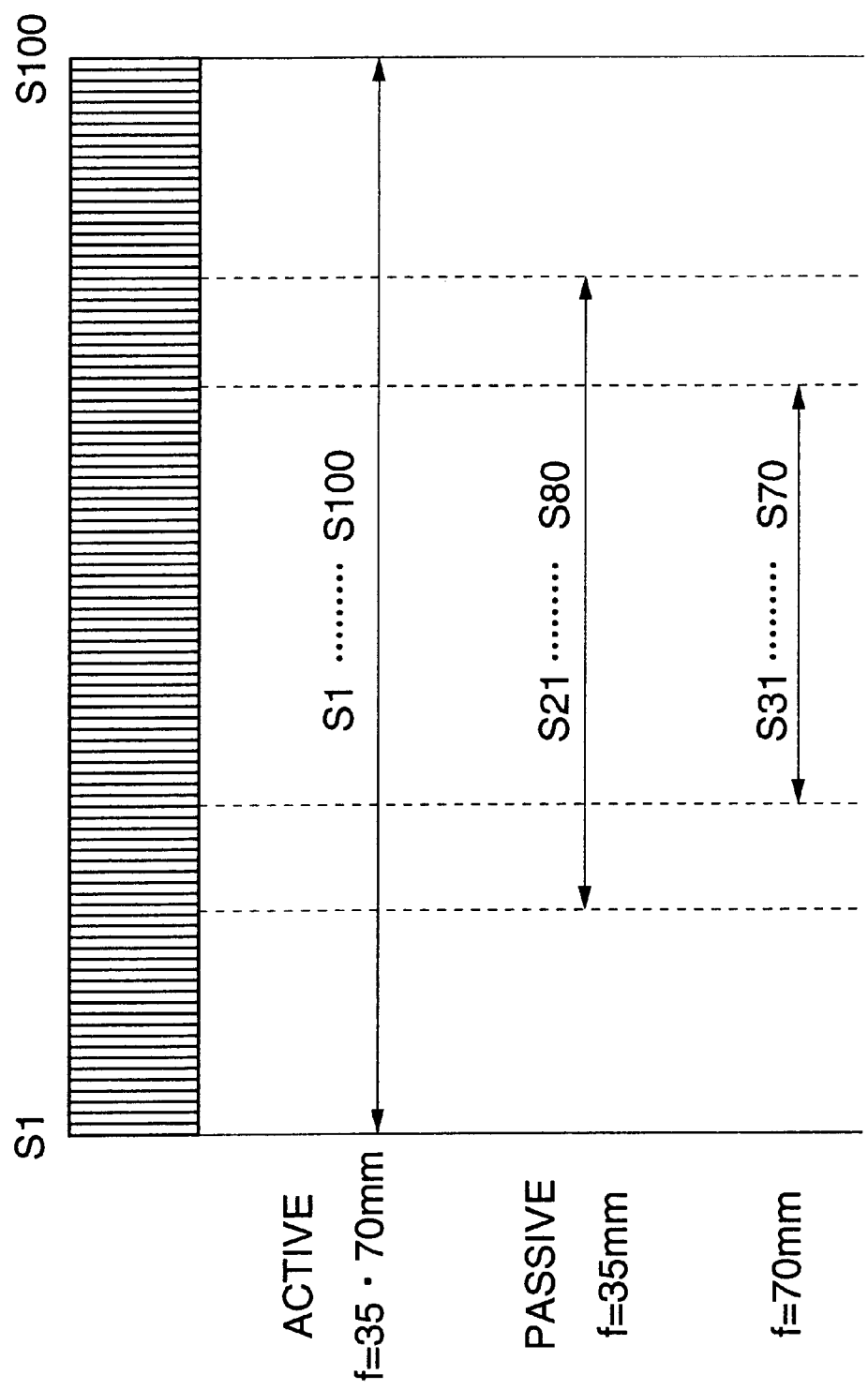

ACTIVE
f=35mm

ACTIVE
f=70mm

PASSIVE
f=35mm

PASSIVE
f=70mm

R1 R2 C L2 L1

PROJECTING SECTION

R1' R2' C' L2' L1'

LIGHT RECEIVING SECTION

ACTIVE
f=35mm

ACTIVE
f=70mm

ACTIVE
f=105mm

PASSIVE
f=35mm

PASSIVE
f=70mm

PASSIVE
f=105mm

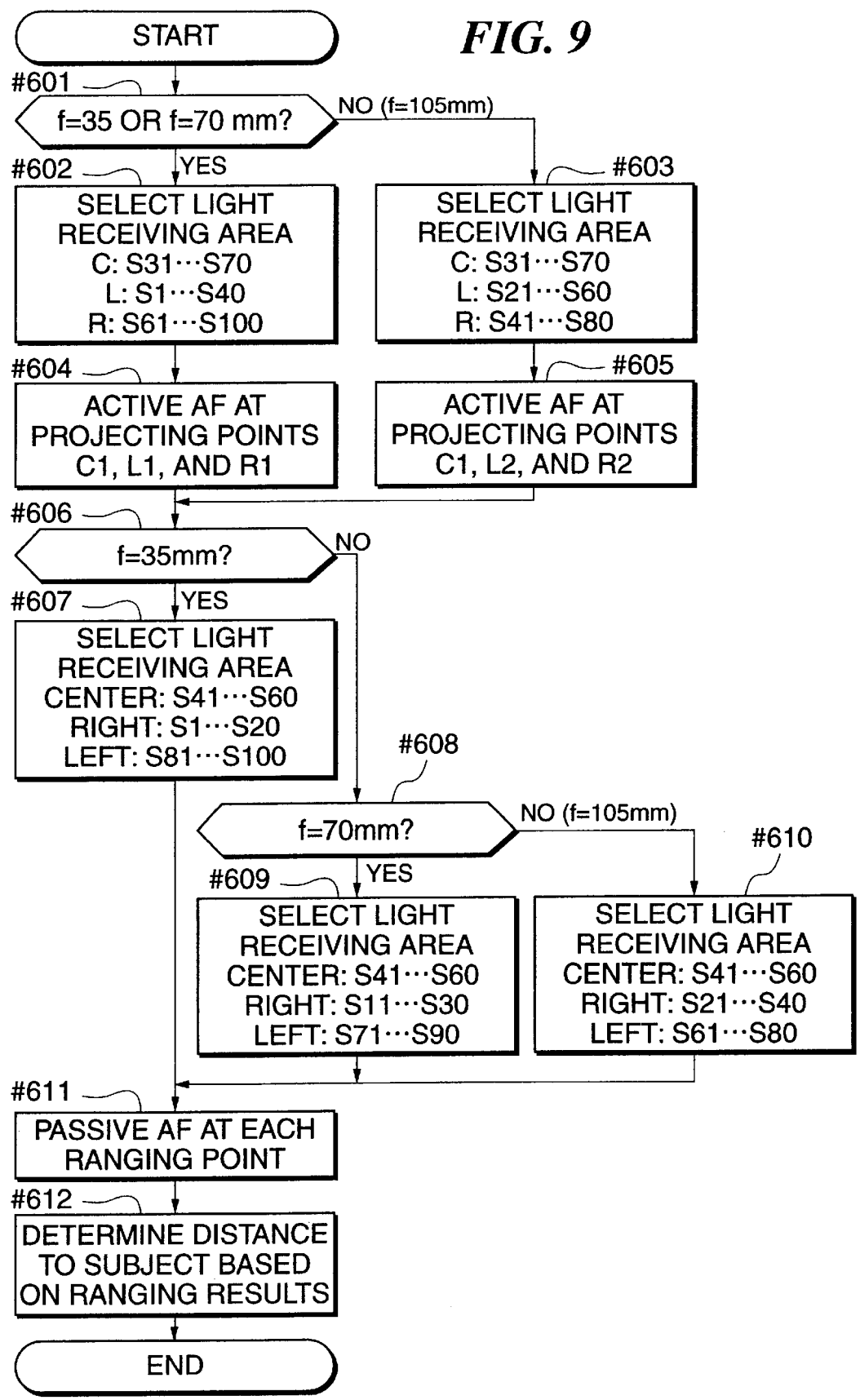

RANGEFINDER DEVICE AND CAMERA

BACKGROUND OF THE INVENTION

1. Field of the Invention

The present invention relates to improvements in or to a rangefinder device and a camera which can measure distances based on both an active method and on a passive method.

2. Description of the Related Art

As a rangefinder device provided in a conventional camera, there has been proposed a rangefinder device by Japanese Patent Publication (KOKOKU) No. 5-22843, which uses a so-called active method, and is constructed such that the camera flashes or projects a subject, and when integrating the reflected light, a pair of CCDs arranged like a ring cycle accumulated charges, while a charge rejecting means (hereinafter referred to as "the skim means") rejects a fixed amount of charges of extraneous-light components other than reflected light by the projection, and the distance to the subject is determined based on the relative value of the receiving position of the reflected light from the subject, using signals from the pair of CCDS.

Another rangefinder device of this kind has been proposed by Japanese Laid-Open Patent Publication (KOKAI) No. 9-196665, which can measure the distance based not only on the active method but also on a passive method using only extraneous light, by turning off the projection and stopping the operation of the skim means.

The above described autofocus optical system is generally provided on an optical axis different from the photographic optical system or the finder optical system. With such a camera, if the focal distance of the taking lens is changed, the ranging frame in the finder deviates from the actual ranging area. In such a case, if the distance is measured according to the passive method with a main subject present within the ranging frame and with an object present outside the ranging frame, the object being at a different distance from the main subject, the result of the distance measurement is affected by the object located outside the main subject. That is, a so-called conflict between far and near objects may occur.

Thus, Japanese Laid-Open Patent Publication (KOKAI) No. 2-293833 has proposed a camera which executes ranging calculations using only a part of pixel data that corresponds to the ranging frame out of the actual ranging area, depending on the focal distance.

However, with the rangefinder device that can use both the active and passive methods (hereinafter referred to as "the hybrid rangefinder device") as disclosed in Japanese Laid-Open Patent Publication (KOKAI) No. 9-196665, if such control as proposed by Japanese Laid-Open Patent Publication (KOKAI) No. 2-293833 is executed, a sensor for use in a ranging operation has a reduced light receiving area on a long focal distance side. Thus, the active method can only deal with a reduced range of distances to which the camera can be adapted, thus making it impossible to carry out measurement of the distance to a subject located at a short distance. This phenomenon will be described with reference to FIG. 10.

In FIG. 10, reference numerals 201 and 202 denote a first light receiving element CCD (L) and a second light receiving element CCD (R), respectively. Reference numerals 203 and 204 denote light receiving lenses with their principal points arranged at a fixed interval (baseline length) B. Reference numeral 205 denotes an infrared light emitting diode (hereinafter referred to as "the IRED") as a projecting element, and reference numeral 206 denotes a projecting lens. The IRED 205 and the projecting lens 206 form projecting means. Reference numeral 207 denotes a subject.

In the figure, the distance from the principal points of the light receiving lenses 203, 204 to the CCD 201, 202 is defined as f, and the distance from the principal points of the light receiving lenses 203, 204 to the subject 207 is defined as H. The interval (baseline length) between the principal points of the light receiving lenses 203 and 204 is defined as B, and the interval between the principal points of the projecting lenses 206 and the light receiving lens 203 is defined as K.

Further, assuming that the distance by which a received light image moves from a central position of reflected light observed when the subject 207 is located at a point at infinity and if reflected light therefrom is collected by the light receiving lens 203 and then formed into an image on the CCD 201, to a central position of reflected light observed when the subject 207 is located at the above distance H and if reflected light therefrom is collected by the light receiving lens 203 and then formed into an image on the CCD 201 is defined as $X_1$, and the distance by which the received light image moves from a central position of reflected light observed when the subject 207 is located at the point at infinity and if reflected light therefrom is collected by the light receiving lens 204 and then formed into an image on the CCD 202, to a central position of reflected light observed when the subject 207 is located at the above distance H and if reflected light therefrom is collected by the light receiving lens 204 and then formed into an image on the CCD 202 is defined as $X_2$, the following relationship is established:

$$H=(B \times f)/(X_2-X_1) \quad (1)$$

By determining the denominator $(X_2-X_1)$ on the right side of the above Equation (1) using the known phase difference detecting method, the distance to the subject 207 can be calculated.

Here, the distances by which the received light images move on the CCD 201 and the CCD 202 will be explained.

The distance $X_1$ by which the image moves on the CCD 201 is given by:

$$X_1=(K \times f)/H$$

The distance $X_2$ by which the image moves on the CCD 202 is given by:

$$X_2=\{(K+B) \times f\}/H$$

Accordingly, as the light receiving areas of the CCD 201 and the CCD 202 are shorter, the moving distances $X_1$ and $X_2$ increase when the distance H to the subject is short, resulting in that the received light images fall out of the light receiving areas of the CCD 201 and CCD 202. Therefore, to enable measurement of the distance H to the subject over a large range, that is, from a far distance to a close distance, the light receiving areas of the CCD 201 and the CCD 202 have to be sufficiently large.

SUMMARY OF THE INVENTION

It is an object of the present invention to provide a rangefinder device and a camera which, in measuring a distance by the active method, are capable of properly measuring the distance even if the object to be measured is located at a short distance, while in measuring a distance by the passive method, are capable of measuring the distance without causing the conflict between far and near objects.

It is another object of the present invention to provide a rangefinder device and a camera which are capable of obtaining highly accurate distance measurement information from both results of the distance measurements executed according to the active method and the passive method.

To attain the above objects, the present invention provides a rangefinder device comprising a projecting section that projects spot-shaped light on a range-finding object, a light receiving section comprising a plurality of photoelectric converting elements, a first calculating section that calculates distance measurement information based on an output from the light receiving section receiving reflected light from the range-finding object, by driving the projecting section to project the light, and a second calculating section that calculates distance measurement information based on an output from the light receiving section receiving extraneous light reflected from the range-finding object, without driving the projecting section, and a control section that sets a light receiving range of the light receiving section used for calculation of the distance measurement information by the second calculating section to be narrower than a light receiving range of the light receiving section used for calculation of the distance measurement information by the first calculating section.

Preferably, the projecting section projects light in a plurality of different directions, and the light receiving section comprises a plurality of light receiving sections disposed to receive respective corresponding lights obtained when light projected in the plurality of different directions is reflected by the range-finding object, and the control section sets a light receiving range of the plurality of light receiving sections used for calculation of the distance measurement information by the second calculating section to be narrower than a light receiving range of plurality of light receiving sections used for calculation of the distance measurement information by the first calculating section.

More preferably, the rangefinder device according to the present invention comprises a third calculating section that calculates final distance measurement information based on the distance measurement information obtained by the first calculating section and the distance measurement information obtained by the second calculating section.

To attain the above objects, the present invention also provides a camera comprising a projecting section that projects spot-shaped light on a subject, a light receiving section comprising a plurality of photoelectric converting elements, a first calculating section that calculates distance measurement information based on an output from the light receiving section receiving reflected light from the subject, by driving the projecting section to project the light, and a second calculating section that calculates distance measurement information based on an output from the light receiving section receiving extraneous light reflected from the subject without driving the projecting section, and a control section that sets a light receiving range of the light receiving section used for calculation of the distance measurement information by the second calculating section to be narrower than a light receiving range of the light receiving section used for calculation of the distance measurement information by the first calculating section.

Preferably, the projecting section projects light in a plurality of different directions, and the light receiving section comprises a plurality of light receiving sections disposed to receive respective corresponding lights obtained when light projected in the plurality of different directions is reflected by the subject, and the control section sets a light receiving range of the plurality of light receiving sections used for calculation of the distance measurement information by the second calculating section to be narrower than a light receiving range of plurality of light receiving sections used for calculation of the distance measurement information by the first calculating section.

Preferably, the camera according to the first aspect comprises a taking lens, and a focal-distance detecting section that detects a focal distance of the taking lens, and the control section switches the light receiving range of the light receiving section used for calculation of the distance measurement information by the second calculating section, depending on the focal distance detected by the focal-distance detecting section.

Specifically, the control section sets the light receiving range of the light receiving section used for distance measurement by the second calculating section to a narrower range as the focal distance detected by the focal-distance detecting section increases.

In a preferred form of the present invention, there is provided a camera comprising a plurality of projecting sections arranged so as to project spot-shaped lights in a plurality of directions for left and right portions of a subject and in one direction for a central portion thereof, a light receiving section comprising a plurality of photoelectric converting elements, the light receiving section being arranged to receive lights reflected from the subject when the lights are projected on the subject by the plurality of projecting sections, a first calculating section that calculates distance measurement information based on outputs from the light receiving section receiving reflected lights from the subject, by driving the projecting sections to project the lights, a second calculating section that calculates distance measurement information based on outputs from the light receiving section receiving extraneous light reflected from the subject, without driving the projecting sections, and a control section that sets a light receiving range of the light receiving section used for calculation of the distance measurement information by the second calculating section to be narrower than a light receiving range of the light receiving section used for calculation of the distance measurement information by the first calculating section.

Preferably, the plurality of projecting sections comprise a plurality of projecting sections for projecting light in the plurality of directions for the left and right portions of the subject and including at least two first projecting sections arranged to project light onto outer portions of the respective left and right portions of the subject, and at least two second projecting sections arranged to project light onto inner portions of the respective left and right portions of the subject, and wherein the first projecting sections are used if a focal distance that is shorter than a predetermined distance is detected by the focal-distance detecting section, and the second projecting sections are used if a focal distance that is longer than the predetermined distance is detected by the focal-distance detecting section.

Preferably, the camera according to the present invention comprises a third calculating section that calculates final distance measurement information based on the distance measurement information obtained by the first calculating section and the distance measurement information obtained by the second calculating section.

To attain the above objects, the present invention further provides a rangefinder device comprising a projecting section that projects light on a range-finding object, a light receiving section comprising a plurality of photoelectric converting elements, a ranging section that performs an active ranging operation of driving the projecting section and calculating distance measurement information based on an output from the light receiving section receiving light reflected from the range-finding object when the light is projected on the range-finding object by the projecting section, and a passive ranging operation of calculating, without driving the projecting section, distance measurement information based on an output from the light receiving section receiving the light from the range-finding object, and a control section that, during the active ranging operation, causes the ranging section to calculate the distance measurement information based on outputs from an identical range of the photoelectric converting elements even when a focal distance changes within a predetermined range, and, during the passive ranging operation, is operable when the focal distance changes within the predetermined range, for setting a range of the photoelectric converting elements used for calculation of the distance measurement information to a narrower range if the focal distance is set to a first value than if the focal distance is set to a second value which is shorter than the first value.

In a preferred form of the present invention, there is provided a rangefinder device comprising a projecting section that projects light in a plurality of directions corresponding to central, right, and left portions of a screen, a light receiving section comprising a plurality of photoelectric converting elements for receiving lights reflected from range-finding objects when the light is projected in the plurality of directions, a ranging section that performs an active ranging operation of calculating first distance measurement information based on outputs from a range of the photoelectric converting elements of the light receiving section that receive reflected light resulting from projection of light in the direction corresponding to the central portion of the screen when the projecting section is driven, calculating second distance measurement information based on outputs from a range of the photoelectric converting elements of the light receiving section that receive reflected light resulting from projection of light in the direction corresponding to the right portion of the screen when the projecting section is driven, and calculating third distance measurement information based on outputs from a range of the photoelectric converting elements of the light receiving section that receive reflected light resulting from projection of light in the direction corresponding to the left portion of the screen when the projecting section is driven, and a passive ranging operation of calculating fourth distance measurement information based on outputs from a range of the photoelectric converting elements of the light receiving section that receive light reflected from the range-finding object corresponding to the central portion of the screen, calculating fifth distance measurement information based on outputs from a range of the photoelectric converting elements of the light receiving section that receive light reflected from the range-finding object corresponding to the right portion of the screen, and calculating sixth distance measurement information based on outputs from a range of the photoelectric converting elements of the light receiving section that receive light reflected from the range-finding object corresponding to the left of the screen, and a control section that, during the active ranging operation, applies an identical range of the photoelectric converting elements for use in calculating at least the second or third distance measurement information obtained from the projection of light in the direction corresponding to the right or left portion of the screen, even when a focal distance changes within a predetermined range, and, during the passive ranging operation, shifts the range of the photoelectric converting elements for use in calculating at least the fifth or sixth distance measurement information in a direction toward the range of the photoelectric converting elements for use in calculating the fourth distance measurement information, when the focal distance is equal to or greater than a predetermined value.

In a more preferred form, the range of the photoelectric converting elements used to calculate the fifth distance measurement information is formed of a plurality of photoelectric converting elements having a first end and a second end, the range of the photoelectric converting elements used to calculate the fourth distance measurement information is formed of a plurality of photoelectric converting elements having a third end located on a side of the second end and a fourth end, and the range of the photoelectric converting elements used to calculate the sixth distance measurement information is formed of a plurality of photoelectric converting elements having a fifth end located on a side of the fourth end and a sixth end, and during the passive ranging operation, the control section shifts the range of the photoelectric converting elements used to calculate the fifth distance measurement information toward the third end or shift the range of the photoelectric converting elements used to calculate the sixth distance measurement information toward the fourth when the focal distance is equal to or greater than the predetermined value.

The ranges of the photoelectric converting elements of the light receiving section used to calculate the distance measurement information on the range-finding objects corresponding to the central, right, and left portions of the screen are formed on an identical light receiving section.

Alternatively, the ranges of the photoelectric converting elements of the light receiving section used to calculate the distance measurement information on the range-finding objects corresponding to the central, right, and left portions of the screen are formed on a plurality of separate light receiving sections.

With the above arrangements of the present invention, in measuring a distance by the calculating means, the distance can be properly measured even if the object to be measured is located at a short distance, while in measuring a distance by the second calculating means, the distance can be measured without causing the conflict between far and near objects.

Furthermore, the rangefinder device and the camera according to the present invention can obtain very accurate distance measurement information using both results of the distance measurements executed by the first and second calculating means.

The above and other objects, features and advantages of the present invention will become more apparent from the following detailed description taken in conjunction with the accompanying drawings.

BRIEF DESCRIPTION OF THE DRAWINGS

FIG. 1 is a block circuit diagram showing the construction of essential parts of a camera according to a first embodiment of the present invention;

FIG. 2 is a view showing the relationship between the focal distance of a taking lens and a light receiving area of a sensor for use in distance measurement according to the first embodiment;

FIG. 9 is a flow chart showing a ranging operation performed by the camera according to the second embodiment.

DESCRIPTION OF THE PREFERRED EMBODIMENTS

Figure 3A:
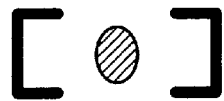
FIGS. 3A to 3D are views showing the relationship between "a projected image and a ranging frame" and the relationship between "a ranging area and the ranging frame" according to the first embodiment.

The present invention will be described below with reference to the drawings showing preferred embodiments thereof.

(First Embodiment)

FIG. 1 is a block circuit diagram showing the construction of a camera according to a first embodiment of the present invention.

In FIG. 1, reference numeral 101 denotes a taking lens that can switch between focal distances of 35 and 70 mm, 102 a focal-distance detecting device for detecting the focal distance of the taking lens 101, and 103 a finder section. Reference numeral 104 denotes a projecting section that projects spot-shaped light (hereinafter also referred to as "the spot projections"), and 105 a light receiving section having a light receiving sensor comprised of a plurality of pixels. The projecting section 104 and the light receiving section 105 constitute a ranging section (distance measuring section) 108. Reference numeral 109 denotes a CPU incorporating a light receiving area-selecting section 106 and a distance measurement information-calculating section 107.

The light receiving area-selecting section 106 selects a light receiving area (pixel (light receiving) range) of the light receiving sensor in the light receiving section 105. The distance measurement information-calculating section 107 calculates the distance to a subject from an output signal from the light receiving section 105. A ranging method used by the ranging section 108 is a hybrid type that includes both the active and passive methods.

FIG. 2 is a view showing the relationship between the focal distance of the taking lens 101 of the camera constructed as described above and the light receiving area of the sensor.

The light receiving sensor in the light receiving section 105 is comprised of 100 pixels from S1 to S100 (photoelectric converting elements). With the active method, a large light receiving area (S1 to S100) is used irrespective of the focal distance of the taking lens 101 so that reflected light from the subject can be received whether the subject is at a long or short distance.

On the other hand, with the passive method, a large light receiving area (S21 to S80) is used on a short focal distance side (f=35 mm), while a small light receiving area (S31 to S70) is used on a long focal distance side (f=70 mm), so as to cope with the width of a ranging frame for each focal distance based on a result of detection of the focal distance of the taking lens 101 as executed by the focal-distance detecting device 102.

Figure 3B:
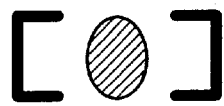
Figure 3C:
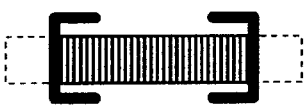
Figure 3D:

FIGS. 3A and 3B show the relationship between a projected image and the ranging frame according to the active method, and FIGS. 3C and 3D show the relationship between the ranging area and the ranging frame according to the passive method.

An increase in the focal distance of the taking lens 101 leads to an increased field magnification of the finder optical system, but even in such a case, the size of the ranging frame remains unchanged. The magnifications of the optical systems of the light receiving section 105 and the projecting section 104 remain unchanged irrespective of the focal distance of the taking lens 101, so that with an increase in the focal distance, the size of the projected image in the active method and the size of the ranging area in the passive method increase relative to the ranging frame, as shown in the figures.

The projected image in the active method is received within the ranging frame, i.e. does not fall out of the frame, irrespective of whether the focal distance f is 35 or 70 mm (see FIGS. 3A and 3B). On the other hand, the ranging area in the passive method partly falls out of the ranging frame when the entire light receiving area is used. Accordingly, portions of the light receiving area indicated by dotted lines, shown in the figures, are not used (see FIGS. 3C and 3D).

Figure 4:
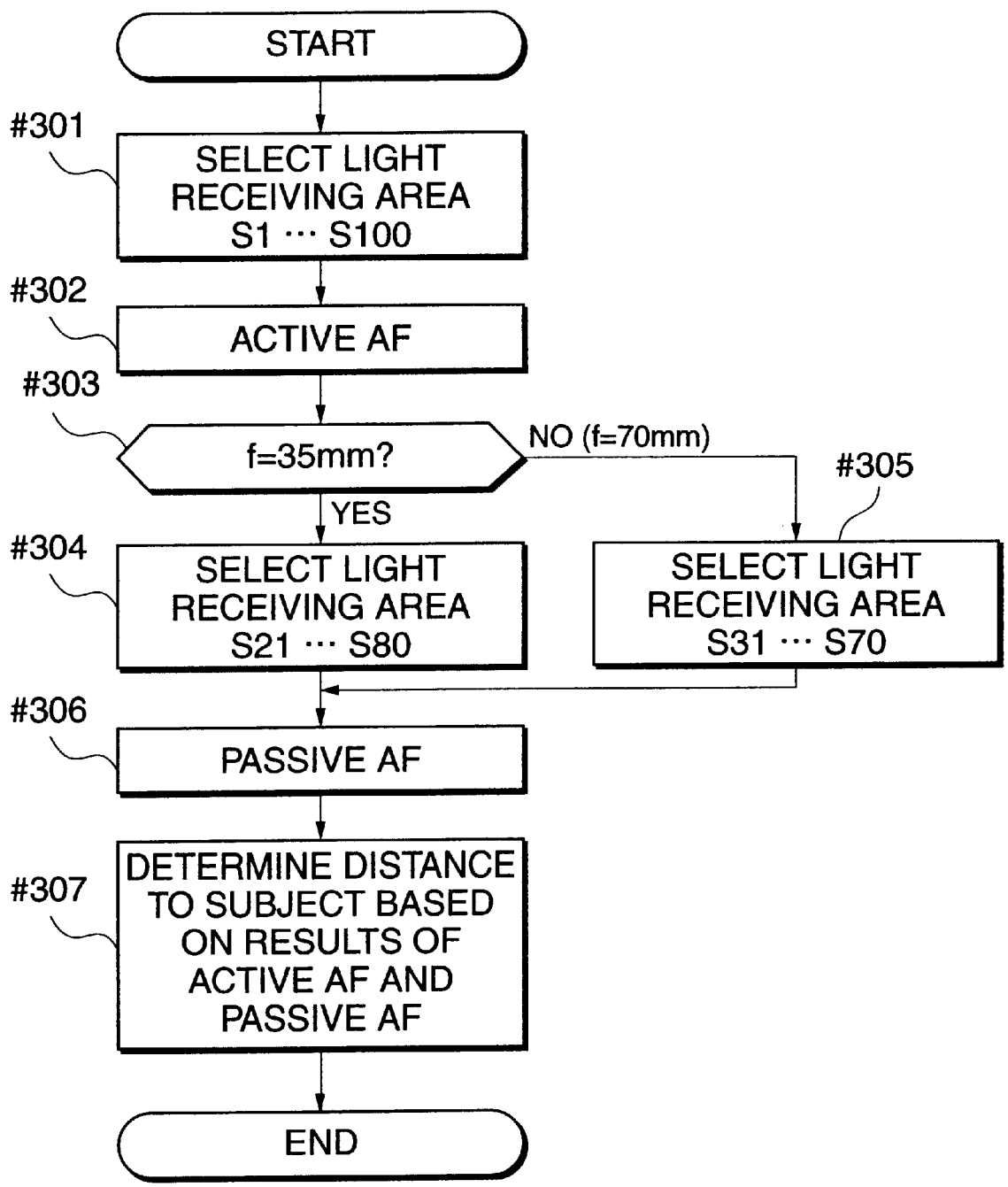
FIG. 4 is a flow chart showing a ranging operation performed by the camera according to the first embodiment.

Now, an actual ranging operation performed by the camera constructed as above will be described with reference to a flow chart of FIG. 4.

First, at a step #301, the light receiving area is selected for a subsequent ranging operation according to the active method. Since the active method always uses the large light receiving area irrespective of the focal distance of the taking lens 101, the range from S1 to S100 is selected as shown in FIG. 2. Specifically, the projecting section 104 flashes or projects the subject, the light receiving section 105 receives light reflected from the subject, and the distance measurement information-calculating section 107 calculates the distance to the subject from a signal from the light receiving section 105.

At the next step #303, to select a light receiving area for subsequent use in the passive method, the focal-distance detecting device 102 detects the focal distance f, and it is determined whether or not the focal distance f is 35 mm. If the focal distance f is 35 mm, the process proceeds to a step #304, wherein the light receiving area from S21 to S80 is selected as shown in FIG. 2, and then the process proceeds to a step #306. On the other hand, if at the above step #303, the focal distance f is not determined to be 35 mm, which means that the focal distance f is 70 mm, the process thus proceeds to a step #305, wherein the light receiving area from S31 to S70 is selected as shown in FIG. 2, and then the process proceeds to the step #306.

At the step #306, a ranging operation is performed according to the passive method. Specifically, the projecting section 104 is turned off to stop the projecting operation so that the light receiving section 105 receives only extraneous light, and the distance measurement information-calculating section 107 calculates the distance to the subject from a signal from the light receiving section 105. Then, at the next step #307, a known reliability determination is executed based on the distance measurement information according to the active method as obtained at the above step #302 and on the distance measurement information according to the passive method as obtained at the above step #306. Thus, the distance to the subject is determined from the reliable information, thereby completing the series of ranging operations.

(Second Embodiment)

Figure 5:
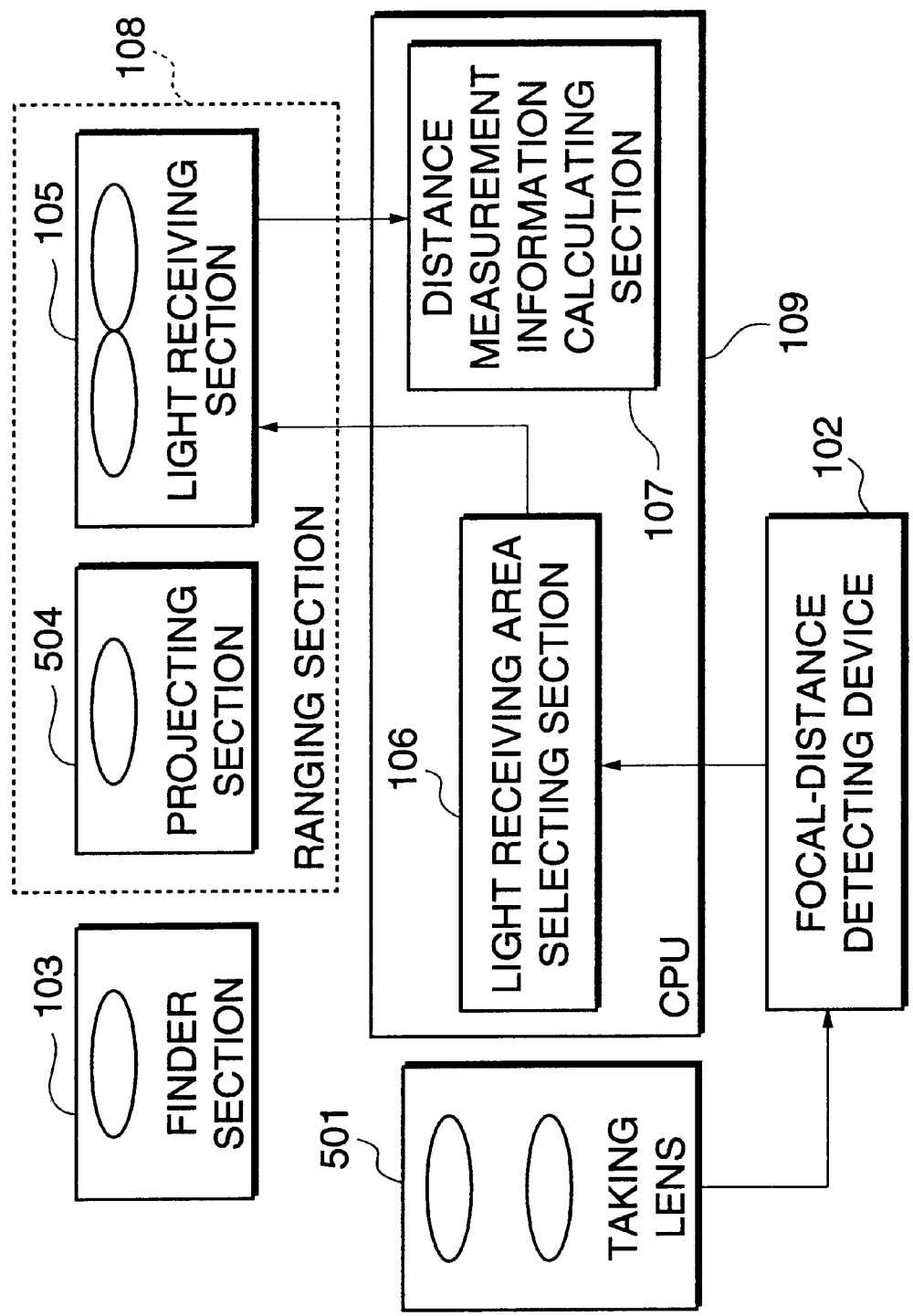
FIG. 5 is a block circuit diagram showing the construction of essential parts of a camera according to a second embodiment of the present invention.

FIG. 5 is a block circuit diagram showing the construction of a camera provided with a multipoint rangefinder device according to a second embodiment of the present invention. In the figure, corresponding elements or parts to those in FIG. 1 are designated by identical reference numerals, and description thereof is omitted.

In FIG. 5, reference numeral 501 denotes a taking lens which is different from the taking lens 101 of FIG. 1 in that it can be switched not only to the focal distances of 35 and 70 mm but also to a focal distance of 105 mm. Further, reference numeral 504 denotes a projecting section that is different from the projecting section 104 of FIG. 1 in that it projects light onto subjects on a photographic screen which are located in a plurality of directions.

Figure 6A:
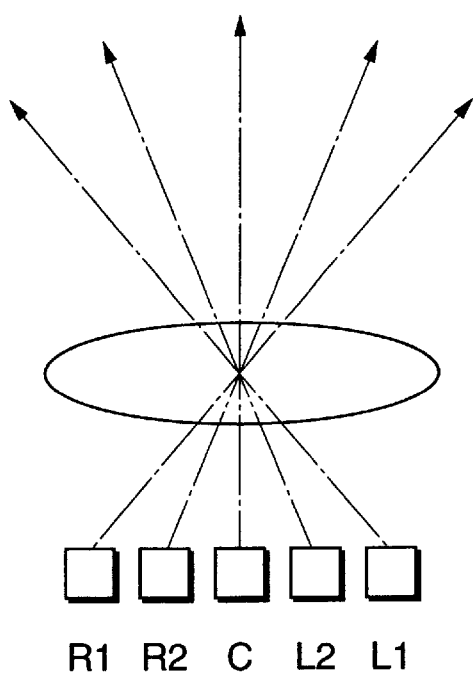
FIG. 6 is a view showing the relationship between projecting and a received light image according to the second embodiment.
Figure 6B:
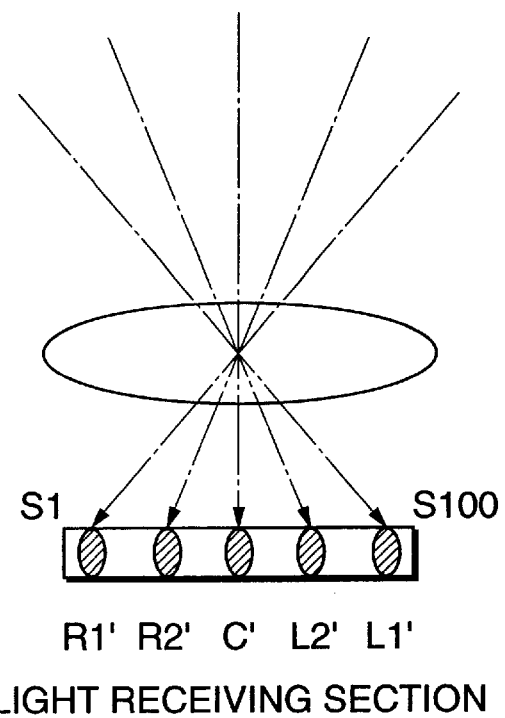

FIG. 6 is a view showing the relationship between projection executed by the camera according to the second embodiment and a received light image.

Shown on a left side of the figure is a projecting section provided with a plurality of infrared light emitting diodes. The projecting section is disposed such that an infrared light emitting diode IRED-C is lighted to project light onto a subject in a central direction, an infrared light emitting diode IRED-R1 or -R2 is lighted to project light onto a subject in a right direction, and an infrared light emitting diode IRED-L1 or -L2 is lighted to project light onto a subject in a left direction.

Further, shown on a right side of FIG. 6 is a light receiving section which has a light receiving sensor disposed to receive received light images (R1', R2', C', L1', and L2') corresponding to the projections from the infrared light emitting diodes. In actuality, two sensors are used to receive light, but one of them is omitted from the figure.

Figure 7:
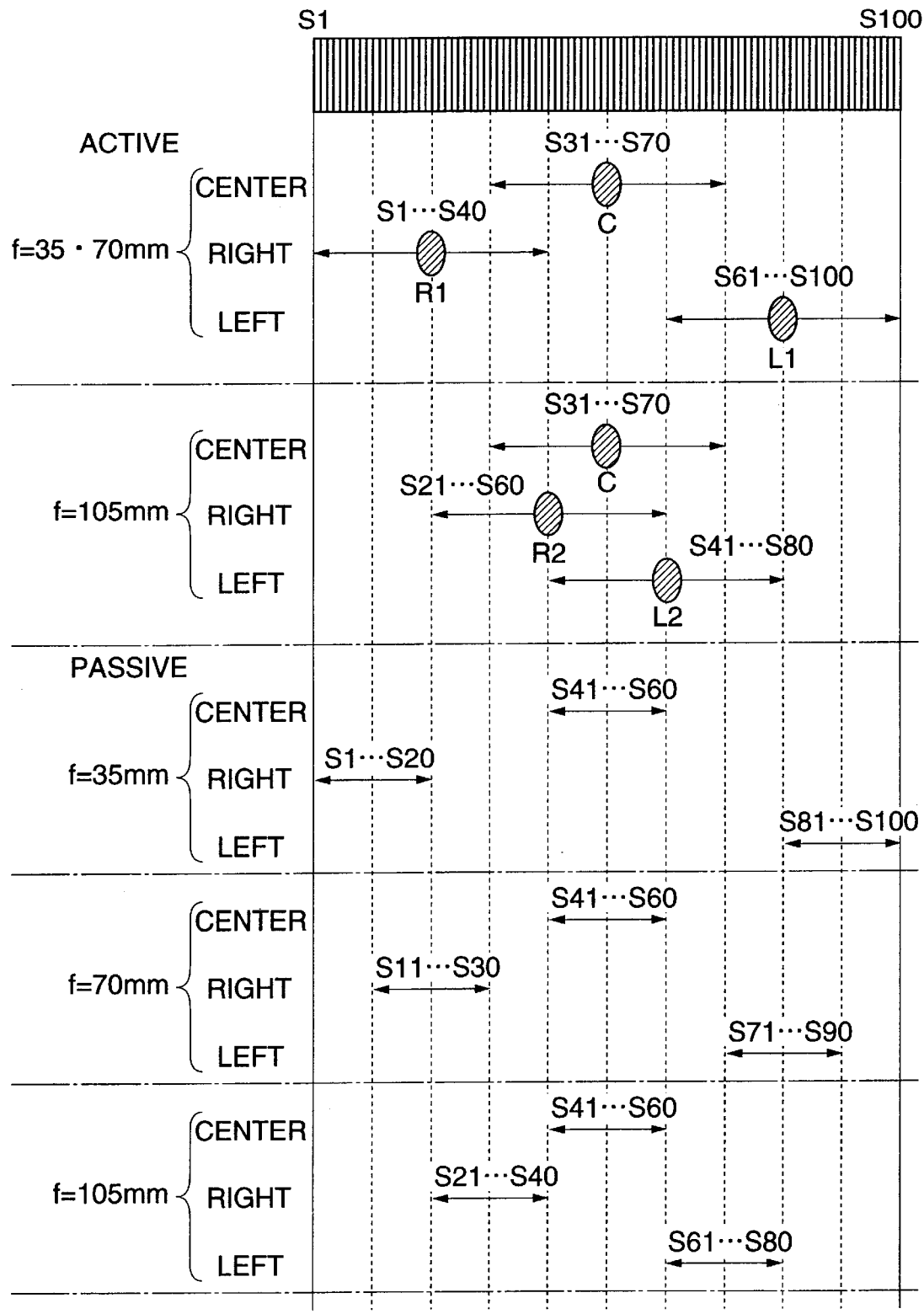
FIG. 7 is a view showing the relationship between the focal distance of the taking lens and the light receiving area of the sensor for use in distance measurement according to the second embodiment.

FIG. 7 is a view showing the relationship between the focal distance of the taking lens 501 and a light receiving range of the sensor and the received light images.

With the active method, if the focal distance of the taking lens 501 is on a short-focal-distance side (f=35 or 70 mm), at three points C, L1, and R1, spanning a wide range, projection is carried out. Then, the light receiving area corresponding to each received light image is selected (the light receiving area S31 to S70 is selected when projection is carried out at the point C, the light receiving area S1 to S40 is selected when projection is carried out at the point R1, and the light receiving area S61 to S100 is selected when projection is carried out at the point L1).

Figure 8A:
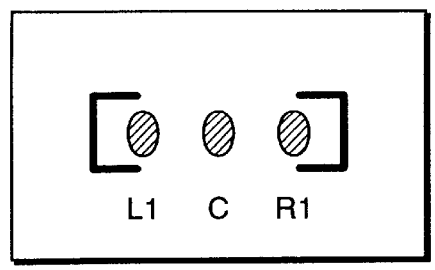
FIGS. 8A to 8F are views showing the relationship between "the projected image and the ranging frame" and the relationship between "the ranging area and the ranging frame" according to the second embodiment.
Figure 8B:
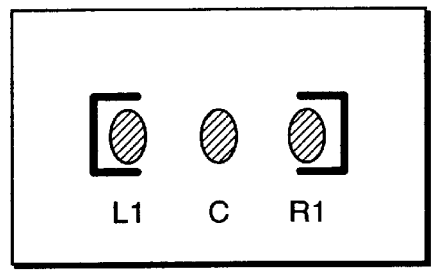
Figure 8C:
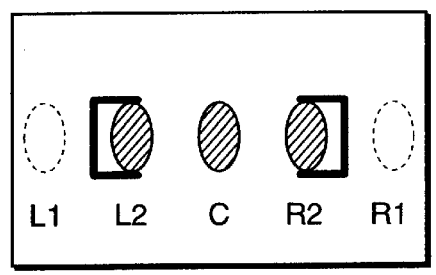

Further, if the focal distance of the taking lens 501 is on a long-focal-distance side (f=105 mm), when projection is carried out at the points C, L1, and R1 extending over a wide range, the outer projecting points L1 and R1 fall out of the ranging frame, as shown in FIG. 8C. Thus, projecting points C, L2, and R2, spanning a small range, are selected for projection. Also in this case, the light receiving area corresponding to each received light image is selected (the light receiving area S31 to S70 is selected when projection is carried out at the point C, the light receiving area S21 to S60 is selected when projection is carried out at the point R2, and the light receiving area S41 to S80 is selected when projection is carried out at the point L2). Further, the light receiving area for each ranging point is large enough to allow reflected light to be received irrespective of whether the subject is at a long or short distance.

On the other hand, with the passive method, based on the result of the detection of the focal distance of the taking lens 501 as executed by the focal distance detecting device 102, if the focal distance f is 35 mm, a light receiving area corresponding to three points spanning a wide range is used (the ranging area in the central direction ranges from S41 to S60, the ranging area in the right direction ranges from S1 to S20, and the ranging area in the left direction ranges from S81 to S100) so as to correspond to the width of the ranging frame for each focal distance. If the focal distance f is 70 mm, a light receiving area corresponding to three points spanning a little smaller range than that in the case of f=35 mm is used (the ranging area in the central direction ranges from S41 to S60, the ranging area in the right direction ranges from S11 to S30, and the ranging area in the left direction ranges from S71 to S90). If the focal distance f is 105 mm, a light receiving area corresponding to three points spanning a further smaller range than that in the case of f=70 mm is used (the ranging area in the central direction ranges from S41 to S60, the ranging area in the right direction ranges from S21 to S40, and the ranging area in the left direction ranges from S61 to S80).

Figure 8D:
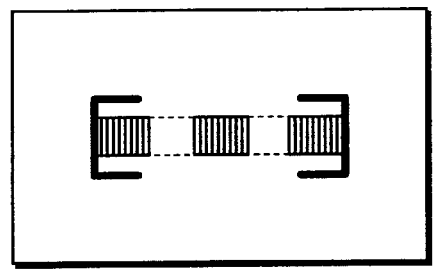
Figure 8E:
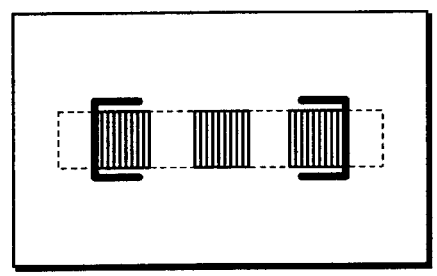
Figure 8F:
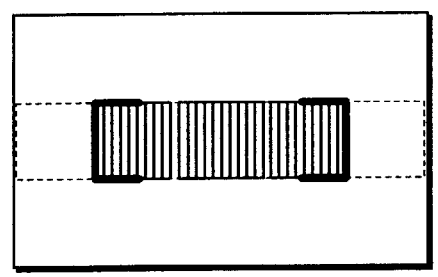
Figure 10:
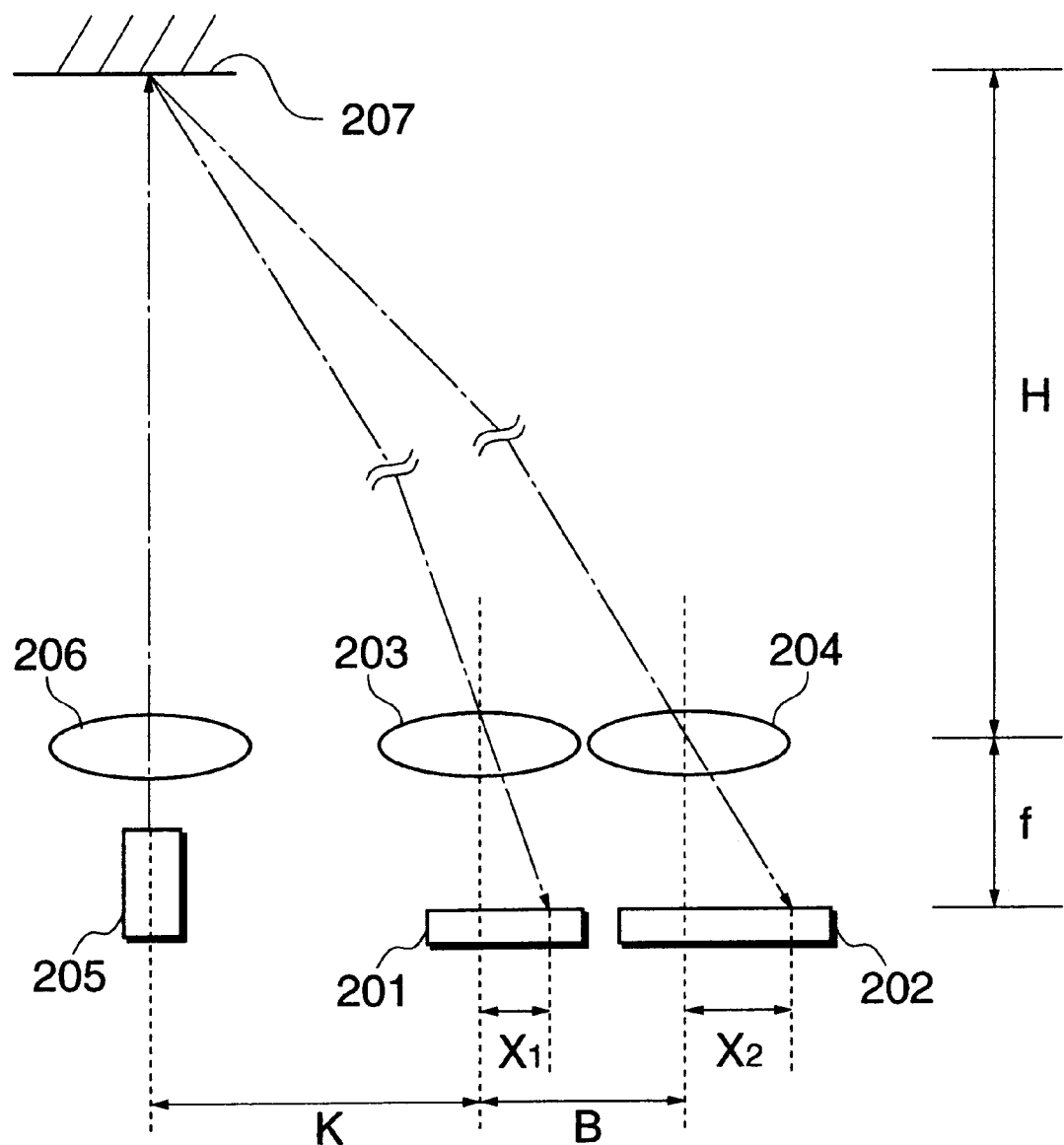
FIG. 10 is a view useful in explaining the principle of distance measurement according to an active method.

FIGS. 8A, 8B, and 8C show the relationship between spot projected images and the ranging frame according to the active method as observed when the projection is selected depending on the focal distance of the taking lens 501. Further, FIGS. 8D, 8E, and 8F show the relationship between the ranging areas and the ranging frame according to the passive method depending on the focal distance of the taking lens 501.

The size of the projected image in the active method and the size of the ranging area in the passive method increase relative to the ranging frame with an increase in the focal distance of the taking lens 501.

With the active method, the projected images obtained by projection at the three points spanning the wide range (C, R1, and L1) do not fall out of the ranging frame if the focal distance is 35 or 70 mm (see FIGS. 8A and 8B). If, however, the focal distance f is 105 mm, the outer projected images (R1 and L1) fall out of the ranging frame.

Thus, if the focal distance f is thus switched from 35 or 70 mm to 105 mm, the projection over the wide range (C, R1, and L1) is switched to the projection over the small range (C, R2, and L2) (see FIG. 8C) so as to prevent the projected images from falling out of the ranging frame.

For the ranging areas in the passive method, if the focal distance f is 35 mm, the full ranging area does not fall out of the ranging frame, but each of the ranging areas for the ranging points in the central, right, and left directions is set short in order to prevent adverse effects of the conflict between far and near objects (see FIG. 8D). If the focal distance f is 70 mm, the full ranging area partly falls out of the ranging frame, and therefore the light receiving area except for the dotted-line-indicated portions is used (see FIG. 8E). If the focal distance f is 105 mm, the ranging areas partly falls out of the ranging frame as in the case of f=70 mm, so that the light receiving area except for the dotted-line-indicated portions is used (see FIG. 8F).

FIG. 9 is a flow chart showing an actual ranging operation performed by the multipoint rangefinder device constructed as shown in FIG. 5. The ranging operation will be described below with reference to this flow chart.

First, at a step #601, the focal-distance detecting device 102 detects the focal distance in order to select light receiving areas for subsequent use in the active method. If the focal distance f is 35 or 70 mm, the process proceeds to a step #602 to select the light receiving area from S31 to S70 for the ranging area in the central direction, the light receiving area from S1 to S40 for the ranging area in the right direction, and the light receiving area from S61 to S100 for the ranging area in the left direction, as shown in FIG. 7. Then, at the next step #604, the projecting section 504 carries out projection at the projecting points (C1, R1, and L1), the light receiving section 105 receives reflected light from the subject, and the distance measurement information-calculating section 107 calculates the distance to the subject with respect to each projecting point, from a signal from the light receiving section 105. The process then proceeds to a step #606.

On the other hand, if the focal distance f is not 35 or 70 mm at the above step #601, that is, the focal distance f is 105 mm, the process proceeds to a step #603 to select the light receiving area from S31 to S70 for the ranging area in the central direction, the light receiving area from S21 to S60 for the ranging area in the right direction, and the light receiving area from S41 to S80 for the ranging area in the left direction, as shown in FIG. 7. Then, at the next step #605, the projecting section 504 carries out projection at the projecting points (C1, R2, and L2), the light receiving section 105 receives reflected light from the subject, and the distance measurement information-calculating section 107 calculates the distance to the subject with respect to each projecting point, from a signal from the light receiving section 105. The process then proceeds to a step #606.

At the step #606, the focal-distance detecting device 102 detects the focal distance in order to select light receiving areas for subsequent use in the passive method. If the focal distance f is 35 mm, the process proceeds to a step #607 to select the light receiving area from S41 to S60 for the ranging area in the central direction, the light receiving area from S1 to S20 for the ranging area in the right direction, and the light receiving area from S81 to S100 for the ranging area in the left direction, as shown in FIG. 7. Then, the process proceeds to a step #611.

Further, if the focal distance f is not determined to be 35 mm at the above step #606, then the process proceeds to a step #608 to determine whether the focal distance f detected by the focal-distance detecting device 102 is 70 mm. If the focal distance is 70 mm, the process proceeds to a step #609 to select the light receiving area from S41 to S60 for the ranging area in the central direction, the light receiving area from S11 to S30 for the ranging area in the right direction, and the light receiving area from S71 to S90 for the ranging area in the left direction, as shown in FIG. 7. Then, the process proceeds to a step #611.

Moreover, if the focal distance f is not determined to be 70 mm at the above step #608, that is, the focal distance f is 105 mm, then the process proceeds to a step #610 to select the light receiving area from S41 to S60 for the ranging area in the central direction, the light receiving area from S21 to S40 for the ranging area in the right direction, and the light receiving area from S61 to S80 for the ranging area in the left direction, as shown in FIG. 7. Then, the process proceeds to a step #611.

At the step #611, a ranging operation is performed according to the passive method. Specifically, the projecting section 504 is turned off to stop the projecting operation, light is received at the light receiving area selected at the above step #607, #609, or #610, and the distance measurement information-calculating section 107 calculates the distance to the subject with respect to each ranging point, from a signal from the light receiving section 105.

Then, at the next step #612, a known reliability determination or the like is executed based on the distance measurement information at the ranging points (in the central, right, and left directions) obtained according to the active method obtained at the above step #604 or #605 and on the distance measurement information at the ranging points (in the central, right, and left directions) obtained according to the passive method obtained at the above step #611. Thus, the distance to the subject is determined from the reliable information, thereby completing the series of ranging operations.

According to the above described embodiments, the light receiving area of the light receiving sensor for use in the active method is set to be smaller than that for use in the passive method, thereby making it possible to obtain accurate ranging results even with a rangefinder device in which the light receiving sensor is commonly used for both the active and passive methods.

Specifically, the following disadvantage is eliminated (because the light receiving area is not narrowed in the embodiments): if the conventional hybrid rangefinder device is adapted to execute ranging or distance calculations using only pixel data corresponding to the ranging frame depending on a change in the focal distance (as is apparent from FIGS. 3A and 3C, irrespective of whether or not the focal distance is switched), the actual possible ranging range becomes narrower during the distance measurement according to the active method, thus making it impossible to measure the distance to a subject at a short distance. Further, in the distance measurement according to the passive method, adverse effects of the conflict between far and near objects can be prevented (because the light receiving area is narrowed compared to the active method).

Furthermore, by changing the light receiving area in the passive method depending on the focal distance as described above, the distance can be more accurately measured irrespective of the focal distance. Moreover, by applying the present invention to an apparatus that is capable of multi-point distance measurement, similar effects can be obtained at each ranging point.

Furthermore, as shown in FIG. 8C, if the focal distance f is switched from 35 or 70 mm to 105 mm, the projection over the wide range (C, R1, and L1) is switched to the projection over the narrow range (C, R2, and L2) so as to prevent the projected image from falling out of the ranging frame. Accordingly, the distance can be measured in an optimal manner according to the active method irrespective of the focal distance. As a result, very accurate distance measurement information can be obtained using results according to the both methods.

In the above described second embodiment, the single light receiving section 105 is arranged for use to calculate distance measurement information on subjects located at the center, right, and left portions of the screen, but a plurality of separate light receiving sections may be arranged so as to correspond to the respective locations.

In the above described embodiments, two or three typical focal distances of the taking lens are selected, the present invention is of course applicable to a so-called zoom camera provided with more focal distances.

What is claimed is:

1. A distance measuring device comprising:
   a projecting section that projects spot-shaped light on a distance measuring object;
   a light receiving section comprising a plurality of photo-electric converting elements;
   a first calculating section that calculates distance measurement information based on an output from said light receiving section receiving reflected light from the distance measuring object, by driving said projecting section to project the light; and a second calculating section that calculates distance measurement information based on an output from said light receiving section receiving light reflected from the distance measuring object, without driving said projecting section; and a control section that selects fewer photoelectric converting elements, out of said plurality of photoelectric converting elements of said light receiving section used for calculation of the distance measurement information by said second calculating section, in comparison with photoelectric converting elements of said light receiving section used for calculation of the distance measurement information by said first calculating section, said photoelectric converting elements being selected out of said plurality of photoelectric converting elements by said control section.

2. A distance measuring device according to claim 1, wherein said projecting section projects light in a plurality of different directions, and said light receiving section comprises a plurality of light receiving sections disposed to receive respective corresponding lights obtained when light projected in the plurality of different directions is reflected by the distance measuring object, and wherein said control section selects fewer photoelectric converting elements, out of said plurality of photoelectric converting elements of said plurality of light receiving sections used for calculation of the distance measurement information by said second calculating section, in comparison with photoelectric converting elements of said plurality of light receiving sections used for calculation of the distance measurement information by said first calculating section, said photoelectric converting elements being selected out of said plurality of photoelectric converting elements by said control section.

3. A distance measuring device according to claim 1, comprising a third calculating section that calculates final distance measurement information based on the distance measurement information obtained by said first calculating section and the distance measurement information obtained by said second calculating section.

4. A camera comprising:

a projecting section that projects spot-shaped light on a subject;

a light receiving section comprising a plurality of photoelectric converting elements;

a first calculating section that calculates distance measurement information based on an output from said light receiving section receiving reflected light from the subject, by driving said projecting section to project the light; and a second calculating section that calculates distance measurement information based on an output from said light receiving section receiving light reflected from the subject without driving said projecting section; and a control section that selects fewer photoelectric converting elements, out of said plurality of photoelectric conventing elements of said light receiving section used for calculation of the distance measurement information by said second calculating section, in comparison with photoelectric converting elements of said light receiving section used for calculation of the distance measurement information by said first calculating section, said photoelectric converting elements being selected out of said plurality of photoelectric converting elements by said control section.

5. A camera according to claim 4, wherein said projecting section projects light in a plurality of different directions, and said light receiving section comprises a plurality of light receiving sections disposed to receive respective corresponding lights obtained when light projected in the plurality of different directions is reflected by the subject, and wherein said control section selects fewer photoelectric converting elements, out of said plurality of photoelectric converting elements of said plurality of light receiving sections used for calculation of the distance measurement information by said second calculating section, in comparison with the photoelectric converting elements of said plurality of light receiving sections used for calculation of the distance measurement information by said first calculating section, said photoelectric converting elements being selected out of said plurality of photoelectric converting elements by said control section.

6. A camera according to claim 4, comprising a taking lens, and a focal-distance detecting section that detects a focal distance of the taking lens, and wherein said control section selects photoelectric converting elements out of said plurality of photoelectric converting elements of said light receiving section used for calculation of the distance measurement information by said second calculating section, depending on the focal distance detected by the focal-distance detecting section.

7. A camera according to claim 6, wherein said control section selects fewer photoelectric converting elements out of said plurality of photoelectric converting elements of said light receiving section used for calculation of the distance measurement information by said second calculating section as the focal distance detected by the focal-distance detecting section increases.

8. A camera according to claim 6, wherein said control section selects the same photoelectric converting elements out of said plurality of photoelectric converting elements of said light receiving section used for calculation of the distance measurement information by said first calculating section irrespective of the focal distance detected by the focal-distance detecting section.

9. A distance measuring device comprising:

a projecting section that projects spot-shaped light on a distance measuring object;

a light receiving section comprising a plurality of photoelectric converting elements;

a first calculating section that calculates distance measurement information based on an output from said light receiving section receiving reflected light from the distance measuring object, by driving said projecting section to project the light; and a second calculating section that calculates distance measurement information based on an output from said light receiving section receiving light reflected from the distance measuring object, without driving said projecting section; and a control section that selects photoelectric converting elements, out of said plurality of photoelectric converting elements of said light receiving section used for calculation of the distance measurement information by said first calculating section, to include photoelectric converting elements which are located outside photoelectric converting elements of said light receiving section used for calculation of the distance measurement information by said second calculating section, said photoelectric converting elements being selected out of said plurality of photoelectric converting elements by said control section.

10. A distance measuring device according to claim 9, wherein said projecting section projects light in a plurality of different directions, and said light receiving section comprises a plurality of light receiving sections disposed to receive respective corresponding lights obtained when light projected in the plurality of different directions is reflected by the distance measuring object, and wherein said control section selects photoelectric converting elements, out of said plurality of photoelectric converting elements of said plurality of light receiving sections used for calculation of the distance measurement information by said first calculating section, to include photoelectric converting elements which are located outside photoelectric converting elements of said plurality of light receiving sections used for calculation of the distance measurement information by said second calculating section, said photoelectric converting elements being selected out of said plurality of photoelectric converting elements by said control section.

11. A distance measuring device according to claim 9, comprising a third calculating section that calculates final distance measurement information based on the distance measurement information obtained by said first calculating section and the distance measurement information obtained by said second calculating section.

12. A camera comprising:

a projecting section that projects spot-shaped light on a subject;

a light receiving section comprising a plurality of photoelectric converting elements;

a first calculating section that calculates distance measurement information based on an output from said light receiving section receiving reflected light from the subject, by driving said projecting section to project the light; and a second calculating section that calculates distance measurement information based on an output from said light receiving section receiving light reflected from the subject without driving said projecting section; and a control section that selects photoelectric converting elements, out of said plurality of photoelectric converting elements of said light receiving section used for calculation of the distance measurement information by said first calculating sections, to include photoelectric converting elements which are located outside photoelectric converting elements of said light receiving section used for calculation of the distance measurement information by said second calculating section, said photoelectric converting elements being selected out of said plurality of photoelectric converting elements by said control section.

13. A camera according to claim 12, wherein said projecting section projects light in a plurality of different directions, and said light receiving section comprises a plurality of light receiving sections disposed to receive respective corresponding lights obtained when light projected in the plurality of different directions is reflected by the subject, and wherein said control section selects photoelectric converting elements, out of said plurality of photoelectric converting elements of said plurality of light receiving sections used for calculation of the distance measurement information by said first calculating section, to include photoelectric converting elements which are located outside photoelectric converting elements of said plurality of light receiving sections used for calculation of the distance measurement information by said second calculating section, said photoelectric converting elements being selected out of said plurality of photoelectric converting elements by said control section.

14. A camera according to claim 12, comprising a taking lens, and a focal-distance detecting section that detects a focal distance of the taking lens, and wherein said control section selects photoelectric converting elements out of said plurality of photoelectric converting elements of said light receiving section used for calculation of the distance measurement information by said second calculating section, depending on the focal distance detected by the focal-distance detecting section.

15. A camera according to claim 14, wherein said control section selects photoelectric converting elements, out of said photoelectric converting elements of said light receiving section used for calculation of the distance measurement information by said second calculating section, to include photoelectric converting elements which are located more outside as the focal distance detected by the focal-distance detecting section decreases.

16. A camera according to claim 14, wherein said control section selects the same photoelectric converting elements out of said plurality of photoelectric converting elements of said light receiving section used for calculation of the distance measurement information by said first calculating section irrespective of the focal distance detected by the focal-distance detecting section.

* * * * *

UNITED STATES PATENT AND TRADEMARK OFFICE
CERTIFICATE OF CORRECTION

PATENT NO. : 6,522,394 B2 Page 1 of 1
DATED : February 18, 2003
INVENTOR(S) : Takashi Ichimiya It is certified that error appears in the above-identified patent and that said Letters Patent is hereby corrected as shown below:

<u>Column 6,</u>
Line 50, delete "Futhermore,the" and insert -- Furthermore, the --.

Signed and Sealed this

Twenty-third Day of September, 2003

JAMES E. ROGAN
*Director of the United States Patent and Trademark Office*